United States Patent
Hales et al.

(10) Patent No.: US 11,181,042 B2
(45) Date of Patent: Nov. 23, 2021

(54) AIRCRAFT ENGINE OPERABILITY

(71) Applicant: ROLLS-ROYCE plc, London (GB)

(72) Inventors: Michael O Hales, Bristol (GB); Craig W Bemment, Derby (GB); Stephane M M Baralon, Derby (GB); Benjamin J Sellers, Bath (GB); Christopher Benson, Swindon (GB); Benedict R Phelps, Derby (GB); Mark J Wilson, Nottingham (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 16/411,347

(22) Filed: May 14, 2019

(65) Prior Publication Data

US 2020/0011238 A1 Jan. 9, 2020

(30) Foreign Application Priority Data

Jul. 3, 2018 (GB) .................................. 1810885
Aug. 28, 2018 (GB) .................................. 1813950

(51) Int. Cl.
*F02C 3/073* (2006.01)
*F02C 7/36* (2006.01)

(52) U.S. Cl.
CPC ................ *F02C 3/073* (2013.01); *F02C 7/36* (2013.01); *F05D 2240/30* (2013.01)

(58) Field of Classification Search
CPC .......... F02C 3/073; F02C 3/107; F02C 3/113; F02C 7/36; F02K 3/06; F02K 3/068
See application file for complete search history.

(56) References Cited

U.S. PATENT DOCUMENTS

| | | | |
|---|---|---|---|
| 2,208,615 | A | 7/1940 | Wattendorf |
| 2,390,879 | A | 12/1945 | Hagen |
| 2,475,121 | A | 7/1949 | Avery |
| 2,940,309 | A | 6/1960 | Henning |
| 3,050,024 | A | 8/1962 | McCormick |
| 3,112,610 | A | 12/1963 | Jerger |
| 3,299,821 | A | 1/1967 | Silvern |
| 3,339,846 | A | 9/1967 | Guetet |
| 3,363,832 | A | 1/1968 | Groff |

(Continued)

FOREIGN PATENT DOCUMENTS

| | | |
|---|---|---|
| EP | 1 985 862 A1 | 10/2008 |
| EP | 2 476 862 A1 | 7/2012 |

(Continued)

OTHER PUBLICATIONS

Guha et al., Determination of optimum specific thrust for civil aero gas turbine engines: a multidisciplinary design synthesis and optimization (2012), SAGE Publishing, Proc IMechE Part G: Journal Aerospace Engineering, ALL (Year: 2012).*

(Continued)

*Primary Examiner* — Jason H Duger
(74) *Attorney, Agent, or Firm* — Oliff PLC (57) ABSTRACT

A gas turbine engine has a cycle operability parameter β in a defined range to achieve improved overall performance, taking into account fan operability and/or bird strike requirements as well as engine efficiency. The defined range of cycle operability parameter β may be particularly beneficial for gas turbine engines in which the fan is driven by a turbine through a gearbox.

17 Claims, 3 Drawing Sheets

(56) References Cited

U.S. PATENT DOCUMENTS

| | | | |
|---|---|---|---|
| 3,480,142 | A | 11/1969 | Bonnet |
| 4,265,596 | A | 5/1981 | Katagiri et al. |
| 5,299,914 | A | 4/1994 | Schilling |
| 5,415,122 | A | 5/1995 | Shen |
| 5,425,617 | A | 6/1995 | Teran |
| 5,456,200 | A | 10/1995 | Shen |
| 5,810,555 | A | 9/1998 | Savage et al. |
| 6,517,309 | B1 | 2/2003 | Zaher |
| 7,037,077 | B2 | 5/2006 | Oono et al. |
| 2006/0228206 | A1* | 10/2006 | Decker ............ F02K 3/06 415/1 |
| 2008/0219850 | A1 | 9/2008 | O'Connor et al. |
| 2010/0028149 | A1 | 2/2010 | Li et al. |
| 2011/0211967 | A1* | 9/2011 | Deal ............ F01D 5/147 416/224 |
| 2012/0082543 | A1 | 4/2012 | Choudhuri |
| 2013/0216364 | A1 | 8/2013 | Evans |
| 2013/0340406 | A1 | 12/2013 | Gallagher et al. |
| 2014/0363304 | A1 | 12/2014 | Murooka |
| 2015/0027101 | A1* | 1/2015 | Hasel ............ F02C 7/36 60/226.1 |
| 2015/0361824 | A1 | 12/2015 | Morin et al. |
| 2016/0003049 | A1* | 1/2016 | Baltas ............ F01D 5/141 416/223 A |
| 2016/0215729 | A1 | 7/2016 | Sabnis |
| 2016/0230674 | A1* | 8/2016 | Schwarz ............ F02C 3/107 |
| 2016/0265430 | A1 | 9/2016 | Schwarz |
| 2016/0273547 | A1 | 9/2016 | Gallagher et al. |
| 2016/0369635 | A1 | 12/2016 | Xu et al. |
| 2017/0175675 | A1* | 6/2017 | Sabnis ............ F02C 3/04 |
| 2017/0175758 | A1 | 6/2017 | Gallagher et al. |
| 2017/0190438 | A1* | 7/2017 | Qiu ............ F01D 25/24 |
| 2017/0210468 | A1 | 7/2017 | Jacob et al. |
| 2019/0093557 | A1 | 3/2019 | Thomas et al. |

FOREIGN PATENT DOCUMENTS

| | | |
|---|---|---|
| EP | 3 372 808 A2 | 9/2018 |
| GB | 736003 A | 8/1955 |

OTHER PUBLICATIONS

Mattingly et al., Aircraft Engine Design, 2002, American Institute of Aeronautics and Astronautics, Inc., Appendix A-C,J (Year: 2002) (Year: 2002).*

Waters et al., Analysis of Turbofan Propulsion System Weight and Dimensions 1977, National Aeronautics and Space Administration, NASA TM X-73199, ALL (Year: 1977) (Year: 1977).*

Larsson et al., Conceptual Design and Mission Analysis for a Geared Turbofan and an Open Rotorconfiguration (2011), ASME, ASME Turbo Expo 2011 GT2011-46451, ALL (Year: 2011).*

Davies et al., A Variable Pitch Fan for an Ultra Quiet Demonstrator Engine (1976), Royal Aeronautical Society, ALL (Year: 1976).*

Rolls Royce, The Jet Engine [2005], Rolls Royce Ltd. London, 5th Edition, Chapter 1.5 (Year: 2005).*

Dec. 20, 2018 Search Report issued in British Patent Application No. 1810885.2.

Dec. 20, 2018 Search Report issued in British Patent Application No. 1810886.0.

Nov. 18, 2019 Extended Search Report issued in European Patent Application No. 19182277.4.

Abhijit Guha, "Optimum Fan Pressure Ratio for Bypass Engines with Separate or Mixed Exhaust Streams," Journal of Propulsion and Power vol. 17, No. 5, Sep.-Oct. 2001, pp. 1117-1124 (Year: 2001).

Antonio Filippone, "Cruise altitude flexibility of jet transport aircraft," Aerospace Science and Technology 14 (2010) 283-294 (Year: 2010).

A. Filippone, "On the benefits of lower Mach number aircraft cruise," The Aeronautical Journal Aug. 2007 531, Paper No. 3163. Jul. 2007 (Year: 2007).

Mark Walters and Edward Schairer, "Analysis of Turbofan Propulsion System Weight and Dimensions," NASA TM X-73,199.

* cited by examiner

AIRCRAFT ENGINE OPERABILITY

The present disclosure relates to a gas turbine engine. Aspects of the present disclosure relate to a high efficiency gas turbine engine having a gearbox.

The design of a modern gas turbine engine must balance a number of factors. Such factors include, for example, engine operability and/or stability during operation, engine efficiency (for example optimized efficiency over a typical flight cycle) engine size, and engine weight.

Gas turbine engines have been proposed that include a fan driven by a turbine via a gearbox. However, whilst such engines may be capable of achieving good efficiency, in some arrangements this is may be at the expense of other operating parameters. For example, some previous gas turbine engines that use a gearbox to drive the fan via the turbine have experienced fan stability issues. Such fan stability issues may include lower than desirable stall margin and/or problems associated with flutter (i.e. self-excitation of the blades due to aero-mechanical interaction at given engine operating points). Gas turbine engines that use a gearbox to drive the fan via the turbine may be inherently more susceptible to damage resulting from the ingestion of foreign objects into the engine. For example, the design of such engines has typically been constrained by the requirement of the fan blades to be able to adequately withstand bird strikes during operation.

According to an aspect, there is provided a gas turbine engine for an aircraft comprising:

an engine core comprising a turbine, a compressor, and a core shaft connecting the turbine to the compressor;

a fan located upstream of the engine core, the fan comprising a plurality of fan blades, an annular fan face being defined at a leading edge of the fan; and a gearbox that receives an input from the core shaft and outputs drive to the fan so as to drive the fan at a lower rotational speed than the core shaft, the gearbox having a reduction ratio GR, wherein:

a quasi-non-dimensional mass flow rate Q is defined as:

$$Q = W \frac{\sqrt{T0}}{P0 \cdot A_{fan}}$$

where:

W is mass flow rate through the fan in Kg/s;

T0 is average stagnation temperature of the air at the fan face in Kelvin;

P0 is average stagnation pressure of the air at the fan face in Pa;

$A_{fan}$ is the area of the fan face in m²;

a specific thrust ST is defined as net engine thrust (N) divided by mass flow rate (Kg/s) through the engine;

a cycle operability parameter β is defined as:

$$\beta = \frac{GR}{Q \cdot ST}$$

and at engine cruise conditions: $1 \text{ K}^{-1/2} \leq \beta \leq 2 \text{ K}^{-1/2}$.

As referred to herein, the area of the fan face ($A_{fan}$) is defined as:

$$A_{fan} = \frac{\pi D^2}{4}\left(1 - \left(\frac{h}{t}\right)^2\right)$$

Where:

D is the diameter (in metres) of the fan at the leading edge (i.e. at the tips of the leading edge of the fan blades);

h is the distance (in metres) between the centreline of the engine and the radially inner point on the leading edge of the fan blade (i.e. of radially inner point of the gas-washed surface of the fan blade); and t is the distance (in metres) between the centreline of the engine and the radially outer point on the leading edge of the fan blade (i.e. t=D/2)

At engine cruise conditions, the cycle operability parameter β may be in a range having an upper bound no greater than 1.9 $\text{K}^{-1/2}$, for example no greater than 1.8 $\text{K}^{-1/2}$, for example no greater than 1.7 $\text{K}^{-1/2}$, for example no greater than 1.6 $\text{K}^{-1/2}$, for example no greater than 1.5 $\text{K}^{-1/2}$. Additionally or alternatively, the cycle operability parameter β may be in a range having a lower bound no less than 1.1 $\text{K}^{-1/2}$, for example no less than 1.2 $\text{K}^{-1/2}$, for example no less than 1.3 $\text{K}^{-1/2}$, for example no less than 1.4 $\text{K}^{-1/2}$, for example no less than 1.5 $\text{K}^{-1/2}$.

Gas turbine engines in accordance with present disclosure may be particularly efficient, as well as having good fan operability and/or bird strike capability. In particular, without being bound by any particular theory, the present inventors have understood that the specific thrust and gear ratio required to provide improved overall efficiency may be balanced with careful control of the quasi-non-dimensional mass flow rate Q in order to also provide adequate fan operability and/or bird strike capability. Providing the cycle operability parameter β in the claimed ranges may result in an engine that improved efficiency combined with sufficient fan operability and/or bird strike capability.

At cruise conditions, the value of Q may be in the range of from: 0.029 to 0.036; 0.0295 to 0.0335; 0.03 to 0.033; 0.0305 to 0.0325; 0.031 to 0.032 or on the order of 0.031 or 0.032. Thus, it will be appreciated that the value of Q may be in a range having a lower bound of 0.029, 0.0295, 0.03, 0.0305, 0.031, 0.0315 or 0.032 and/or an upper bound of 0.031, 0.0315, 0.032, 0.0325, 0.033, 0.0335, 0.034, 0.0345, 0.035, 0.0355 or 0.036. All values of Q referred to herein are use units $\text{Kgs}^{-1}\text{N}^{-1}\text{K}^{1/2}$.

At cruise conditions, the specific thrust of an engine described and/or claimed herein may be less than (or on the order of) any of the following: 110 $\text{Nkg}^{-1}\text{s}$, 105 $\text{Nkg}^{-1}\text{s}$, 100 $\text{Nkg}^{-1}\text{s}$, 95 $\text{Nkg}^{-1}\text{s}$, 90 $\text{Nkg}^{-1}\text{s}$, 85 $\text{Nkg}^{-1}\text{s}$, 80 $\text{Nkg}^{-1}\text{s}$, 75 $\text{Nkg}^{-1}\text{s}$ or 70 $\text{Nkg}^{-1}\text{s}$. The specific thrust may be in an inclusive range bounded by any two of the values in the previous sentence (i.e. the values may form upper or lower bounds).

In use of the gas turbine engine, the rotation of the fan (with associated fan blades) about the rotational axis results in the tip of the fan blade moving with a velocity $U_{tip}$. The work done by the fan blades on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.3, 0.31, 0.32, 0.33, 0.34, 0.35, 0.36, 0.37, 0.38, 0.39 or 0.4 (all units in this paragraph being $\text{Jkg}^{-1}\text{K}^{-1}/(\text{ms}^{-1})^2$). The fan tip loading may be in an inclusive range bounded by any two of the values in the previous sentence (i.e. the values may form upper or lower bounds). Such values of fan tip loading (which may, for example, be chosen to be higher than previous gas turbine engines in which the fan is driven from a turbine via a gearbox) may complement the quasi-non-dimensional mass flow rate Q to help to achieve the desired performance, efficiency, fan stability and bird strike capability.

In some arrangements, a fan pressure ratio, defined as the ratio of the mean total pressure of the flow at the fan exit to the mean total pressure of the flow at the fan inlet, may be no greater than 1.5 at cruise conditions, for example no greater than 1.45, 1.4 or 1.35.

Downstream of the fan, the flow through the gas turbine engine may be split into a core flow (which flows through the engine core) and a bypass flow (which flows through the bypass duct). The gas turbine engine may comprise an annular splitter at which the flow is divided between the core flow that flows through the engine core, and the bypass flow that flows along a bypass duct. In some arrangements, a fan root pressure ratio, defined as the ratio of the mean total pressure of the flow at the fan exit that subsequently flows through the engine core to the mean total pressure of the flow at the fan inlet, may be no greater than 1.25, for example at cruise conditions.

In some arrangements, the fan root pressure ratio at cruise conditions may be no greater than 1.24, for example no greater than 1.23, for example no greater than 1.22, for example no greater than 1.21, for example no greater than 1.2, for example no greater than 1.19, for example no greater than 1.18, for example no greater than 1.17, for example no greater than 1.16, for example no greater than 1.15.

Where the term mean is used herein in relation to a pressure (for example a total pressure), this may be (for example) an area average taken over the relevant surface.

A fan root to tip pressure ratio, defined as the ratio of the mean total pressure of the flow at the fan exit that subsequently flows through the engine core to the mean total pressure of the flow at the fan exit that subsequently flows through the bypass duct, may be no greater than (for example less than) 0.95, for example no greater than 0.94, 0.93, 0.92, 0.91 or 0.9 at cruise conditions.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.380.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio (i.e. (h/t) in the equation for calculating $A_{fan}$ herein). The radius at the hub and the radius at the tip may both be measured at the leading edge (or axially forwardmost) part of the blade. The hub-to-tip ratio refers, of course, to the gas-washed portion of the fan blade, i.e. the portion radially outside any platform. Values of hub-to-tip ratio (h/t) and fan diameter D disclosed herein may be used to calculate the fan area $A_{fan}$. This fan area $A_{fan}$ may be combined with other features disclosed herein.

In this regard, the radius of the fan blade at its hub is the same as the value "h" defined above i.e. the distance (in metres) between the centreline of the engine and the radially inner point on the leading edge of the fan blade. The radius of the fan blade at its tip is the same as the value "t" defined above, i.e. the distance (in metres) between the centreline of the engine and the radially outer point on the leading edge of the fan blade (i.e. t=D/2).

A fan blade and/or aerofoil portion (or gas-washed portion) of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge (which may be referred to as a leading edge sheath), which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades may be formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

A gas turbine engine as described and/or claimed herein may further comprise an intake that extends upstream of the fan blades. An intake length L may be defined as the axial distance between the leading edge of the intake and the leading edge of the tip of the fan blades. The fan diameter D may be as defined elsewhere herein, i.e. the diameter of the fan at the leading edge of the tips of the fan blades. The ratio L/D may be less than 0.5, for example in the range of from 0.2 to 0.45, 0.25 to 0.4 or less than 0.4. Where the intake length varies around the circumference, the intake length L used to determine the ratio of the intake length to the diameter D of the fan may be measured at the $\pi/2$ or $3\pi/2$ positions from top dead centre of the engine (i.e. at the 3 o' clock or 9 o' clock positions), or the average of the intake length at these two positions where they are different.

Arrangements of the present disclosure may be particularly beneficial for fans that are driven via a gearbox. Accordingly, the gas turbine engine comprises a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gearbox is a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4, for example on the order of or at least 3, 3.1, 3.2, 3.3, 3.4, 3.5, 3.6, 3.7, 3.8, 3.9, 4.0, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

The radius of the fan may be measured between the engine centreline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15 deg C. (ambient pressure 101.3 kPa, temperature 30 deg C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent. Cruise conditions thus define an operating point of the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m). In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided a gas turbine engine comprising any one or more of the features described and/or claimed herein. For example, where compatible, such a gas turbine engine may have any one or more of the features or values described herein of: cycle operability parameter $\beta$; quasi-non-dimensional mass flow rate Q; specific thrust; maximum thrust; turbine entry temperature; overall pressure ratio; bypass ratio; fan diameter; fan rotational speed; fan hub to tip ratio; fan pressure ratio; fan root pressure ratio; ratio between the fan root pressure ratio to the fan tip pressure ratio; fan tip loading; number of fan blades; construction of fan blades; and/or gear ratio. Such a gas turbine engine may comprise a gearbox that receives an input from a core shaft and outputs drive to a fan so as to drive the fan at a lower rotational speed than the core shaft.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Embodiments will now be described by way of example only, with reference to the Figures, in which.

Figure 1:
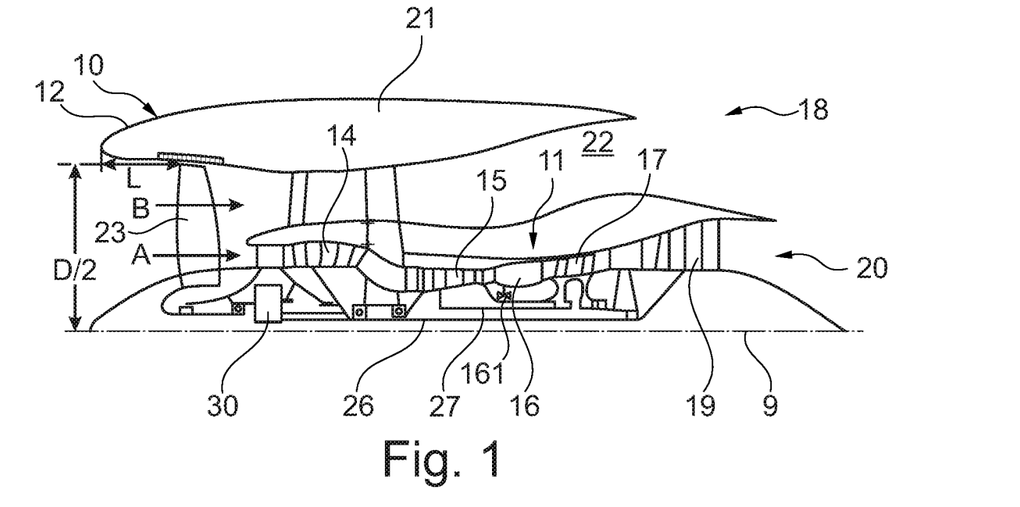
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. A throttle 161 is provided to control the fuel supply to the combustor. The amount of fuel supplied is dependent on the throttle position. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox, having a reduction ratio GR. In other words, the ratio between the rotational speed of the low pressure turbine 19 and the rotational speed of the fan 23 is GR.

Figure 2:
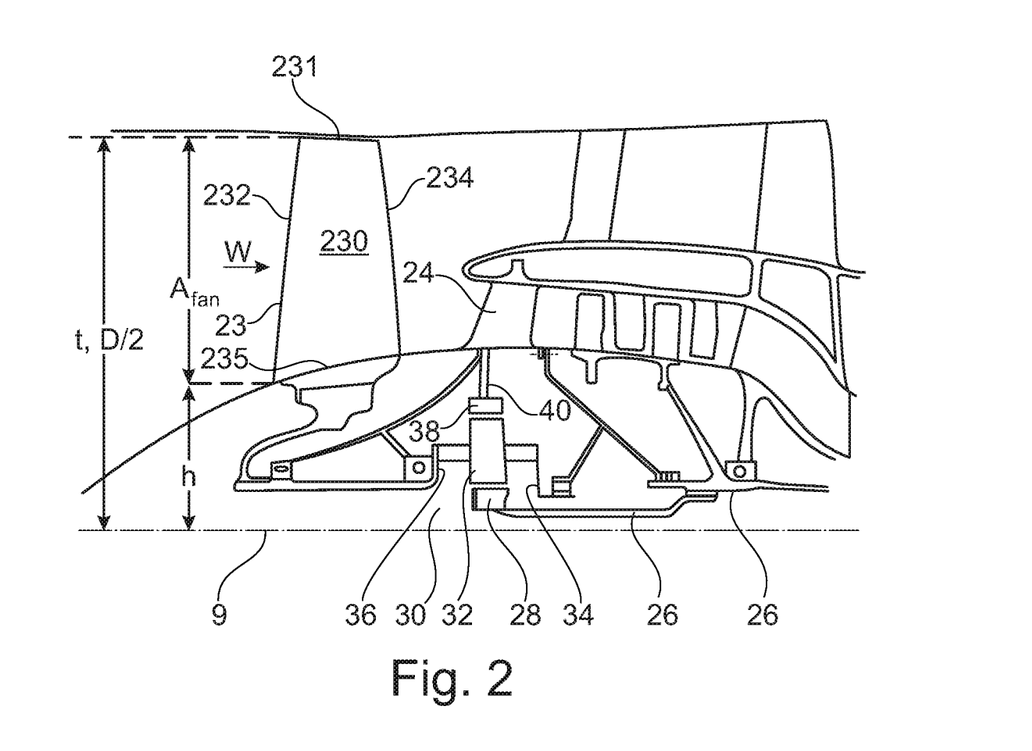
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
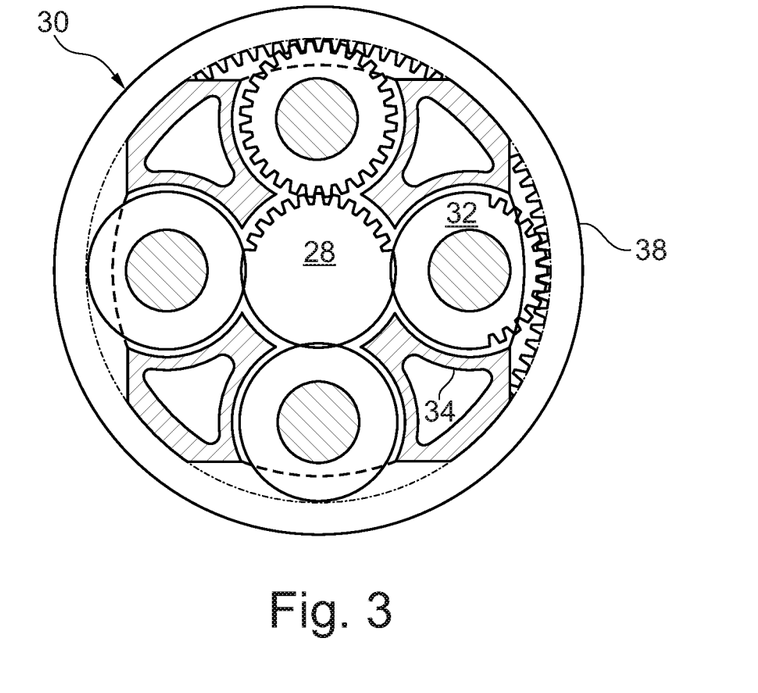
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 18 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
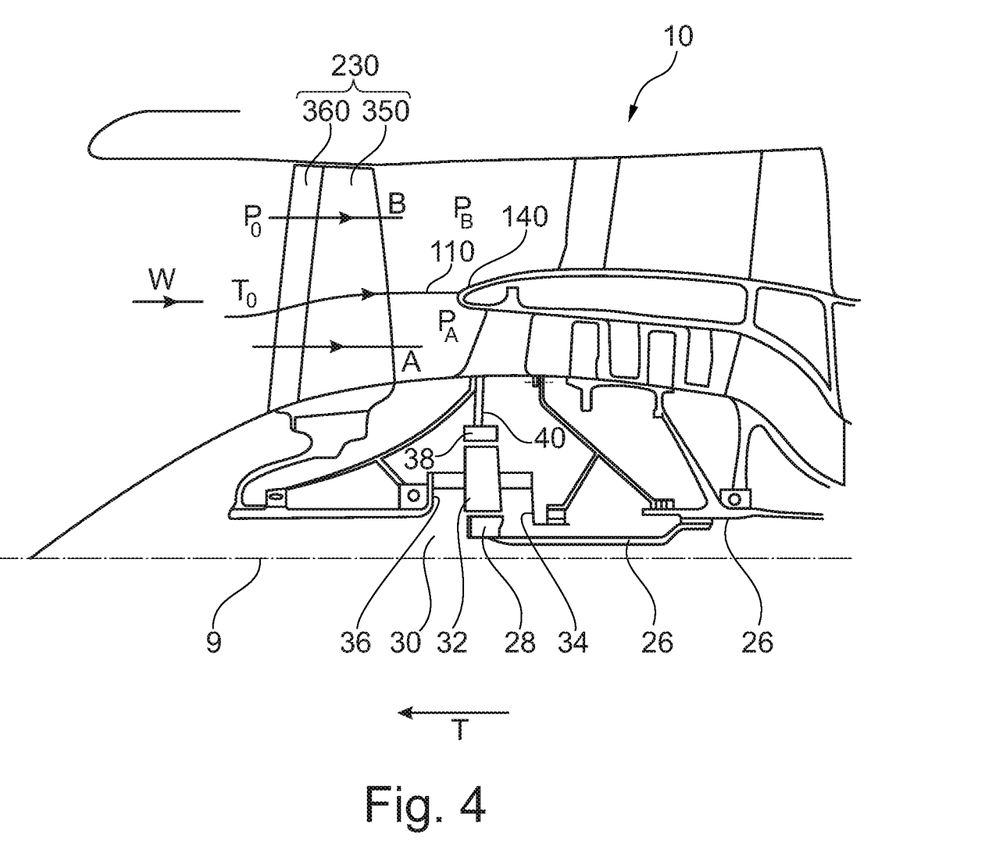
FIG. 4 is another close up sectional side view of an upstream portion of a gas turbine engine showing flow parameters.

Referring to FIG. 2 and FIG. 4, an example of a gas turbine engine 10 in accordance with the present disclosure is shown. Engine dimensions are shown in FIG. 2 and flow parameters at cruise conditions are shown in FIG. 4. The fan 23 comprises a plurality of fan blades 230. Each fan blade 230 has a tip 231, a leading edge 232, a trailing edge 234, and a hub (which may be referred to as a root) 235. The hub 235 may be said to define the radially inner boundary of the gas washed surfaces of the fan blade 230. The fan blade 230 (i.e. the gas washed surfaces of the fan blade 230, which include a pressure surface and a suction surface) extend in a generally radial direction from the root 235 to the tip 231.

A fan face area $A_{fan}$ is shown in FIG. 2 and calculated as:

$$A_{fan} = \frac{\pi D^2}{4}\left(1 - \left(\frac{h}{t}\right)^2\right)$$

FIG. 2 also shows how the values D, h and t relate to the gas turbine engine 10. In particular:

D is the diameter (in metres) of the fan at the leading edge 232 (i.e. at the tips 231 of the leading edge 232 of the fan blades 230);

h is the distance (in metres) between the centreline 9 of the engine 10 and the radially inner point on the leading edge 232 of the fan blade 230 (i.e. the intersection of the leading edge 232 and the hub 235); and t is the distance (in metres) between the centreline 9 of the engine 10 and the radially outer point (i.e. at the tip 231) on the leading edge 232 of the fan blade (i.e. t=D/2).

The value (h/t) may be referred to elsewhere herein—and in other literature in the field—as the hub-to-tip ratio.

As noted elsewhere herein, a quasi non-dimensional mass flow rate Q is defined as:

$$Q = W\frac{\sqrt{T0}}{P0 \cdot A_{fan}}.$$

Where:

W is mass flow rate through the fan in Kg/s;

T0 is average stagnation temperature of the air at the fan face in Kelvin;

P0 is average stagnation pressure of the air at the fan face in Pa; and $A_{fan}$ is the area of the fan face in m², as defined above.

The parameters W, T0, P0 and $A_{fan}$ are all shown schematically in FIGS. 2 and 4.

At cruise conditions of the gas turbine engine 10 (which may be as defined elsewhere herein), the value of Q may be in the ranges described and/or claimed herein, for example in the range of from 0.029 to 0.034 $Kgs^{-1}N^{-1}K^{1/2}$.

Also at cruise conditions, the gas turbine engine 10 generates a thrust T (which may be referred to as a cruise thrust), shown schematically in FIG. 4. This thrust may be equal to the thrust required to maintain the cruise forward speed of an aircraft to which the gas turbine engine 10 is attached, divided by the number of engines 10 provided to the aircraft.

At cruise conditions, the specific thrust ST, which is calculated as the thrust T divided by the mass flow rate W through the engine (which is equal to the mass flow rate W at the fan inlet) may be in the ranges described and/or claimed herein, for example in the range of from 70 $Nkg^{-1}s$ to 110 $Nkg^{-1}s$.

At cruise conditions, a cycle operability parameter β is in the ranges described and/or claimed herein, for example in the range of from 1 $K^{-1/2}$ to 2 $K^{-1/2}$, where the cycle operability parameter β is defined as:

$$\beta = \frac{GR}{Q \cdot ST}$$

As noted above, downstream of the fan 13 the air splits into two separate flows: a first air flow A into the engine core and a second air flow B which passes through a bypass duct 22 to provide propulsive thrust. The first and second airflows A, B split at a generally annular splitter 140, for example at the leading edge of the generally annular splitter 140 at a generally circular stagnation line.

A stagnation streamline 110 stagnates on the leading edge of the splitter 140. The stagnation streamlines 110 around the circumference of the engine 10 form a streamsurface 110. All of the flow A radially inside this streamsurface 110 ultimately flows through the engine core. The streamsurface 110 forms a radially outer boundary of a streamtube that contains all of the flow that ultimately flows through the engine core, which may be referred to as the core flow A. All of the flow B radially outside the streamsurface 110 ultimately flows through the bypass duct 22. The streamsurface 110 forms a radially inner boundary of a streamtube that contains all of the flow B that ultimately flows through the bypass duct 22, which may be referred to as the bypass flow B.

The ratio of the mass flow rate of the bypass flow B to the core flow A may be as described and/or claimed herein, for example at least 10, 11, 12 or 13.

In use, the fan blades 230 of the fan 23 do work on the flow, thereby raising the total pressure of the flow. A fan root pressure ratio is defined as the mean total pressure of the flow at the fan exit that subsequently flows (as flow A) through the engine core to the mean total pressure at the inlet to the fan 23. With reference to FIG. 4, the mean total pressure of the flow at the fan exit that subsequently flows through the engine core is the mean total pressure $P_A$ of the flow that is just downstream of the fan 23 and radially inside the streamsurface 110. Also in FIG. 4, the mean total pressure P0 at the inlet to the fan 23 is the mean total pressure over the surface that extends across the engine (for example from the hub 235 to the tip 231 of the fan blade 230) and is immediately upstream of the fan 23.

The value of the fan root pressure ratio ($P_A/P0$) may be described and/or claimed herein, for example less than 1.25, for example less than 1.22.

A fan tip pressure ratio is defined as the mean total pressure $P_B$ of the flow at the fan exit that subsequently flows (as flow B) through the bypass duct 22 to the mean total pressure at the inlet to the fan 23. With reference to FIG. 4, the mean total pressure of the flow at the fan exit that subsequently flows through the bypass duct 22 is the mean total pressure over the surface that is just downstream of the fan 23 and radially outside the streamsurface 110.

The ratio between the fan root pressure ratio ($P_A/P0$) and the fan tip pressure ratio ($P_B/P0$) may be as described and/or claimed herein, for example less than 0.95, and/or less than 0.9 and/or less than 0.85. This ratio may alternatively be expressed simply as the ratio between the mean total pressure ($P_A$) of the flow at the fan exit that subsequently flows (as flow A) through the engine core to the mean total pressure ($P_B$) of the flow at the fan exit that subsequently flows (as flow B) through the bypass duct 22.

The fan blades 230 may be manufactured using any suitable material or combination of materials, as described elsewhere herein. Purely by way of example, in the FIG. 4 example, the fan blade 330 has a main body 350 attached to a leading edge sheath 360. The main body 350 and the leading edge 360 in the FIG. 4 example are manufactured using different materials. Purely by way of example, the main body 350 may be manufactured using a carbon fibre composite material or an aluminium alloy material (such as an aluminium lithium alloy), and the leading edge sheath 360 may be manufactured from a material that is better able to withstand being struck by a foreign object (such as a bird). Again, purely by way of example, the leading edge sheath may be manufactured using a titanium alloy.

As explained elsewhere herein, gas turbine engines having a cycle operability parameter β in the ranges outlined herein may provide various advantages, such as improving the bird strike capability whilst retaining the efficiency advantages associated with geared and/or low specific thrust gas turbine engines. This may allow greater design freedom in other aspects of the fan system (including fan blades), such as weight, aerodynamic design, complexity and/or cost.

A further example of a feature that may be better optimized for gas turbine engines 10 according to the present disclosure compared with conventional gas turbine engines is the intake region, for example the ratio between the intake length L and the fan diameter D. Referring to FIG. 1, the intake length L is defined as the axial distance between the leading edge of the intake and the leading edge 232 of the tip 231 of the fan blades 230, and the diameter D of the fan 23 is defined at the leading edge of the fan 23. Gas turbine engines 10 according to the present disclosure, such as that shown by way of example in FIG. 1, may have values of the ratio L/D as defined herein, for example less than or equal to 0.45. This may lead to further advantages, such as installation and/or aerodynamic benefits.

The gas turbine engine 10 shown by way of example in FIG. 1 may comprise any one or more of the features described and/or claimed herein. For example, where compatible, such a gas turbine engine 10 may have any one or more of the features or values described herein of: quasi-non-dimensional mass flow rate Q; specific thrust; maximum thrust; turbine entry temperature; overall pressure ratio; bypass ratio; fan diameter; fan rotational speed; fan hub to tip ratio; fan pressure ratio; fan root pressure ratio; ratio between the fan root pressure ratio to the fan tip pressure ratio; fan tip loading; number of fan blades; construction of fan blades; and/or gear ratio.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A method of operating a gas turbine engine for an aircraft, the gas turbine engine having (i) an engine core comprising a turbine, a compressor, and a core shaft connecting the turbine to the compressor, (ii) a fan located upstream of the engine core, the fan comprising a plurality of fan blades, an annular fan face being defined at a leading edge of the fan, and (iii) a gearbox that receives an input from the core shaft and outputs drive to the fan so as to drive the fan at a lower rotational speed than the core shaft, the gearbox having a reduction ratio GR, the method comprising:

operating the gas turbine engine to propel the aircraft at a forward Mach number of 0.8, at an atmospheric pressure of 23000 Pa and an atmospheric temperature of −55 deg. C., such that a cycle operability parameter β satisfies the following:

$$1.2 K^{-1/2} \leq \beta \leq 2.0 K^{-1/2}$$

where:
a quasi-non-dimensional mass flow rate Q is defined as:

$$Q = W \frac{\sqrt{T0}}{P0 \cdot A_{fan}}$$

W is mass flow rate through the fan in Kg/s;
T0 is average stagnation temperature of air at the fan face in Kelvin;
P0 is average stagnation pressure of the air at the fan face in Pa;
$A_{fan}$ is an area of the fan face in $m^2$;
a specific thrust ST is defined as net engine thrust (N) divided by mass flow rate (Kg/s) through the engine; and
the cycle operability parameter β is defined as:

$$\beta = \frac{GR}{Q \cdot ST}.$$

2. The method of claim 1, further comprising:
operating the gas turbine engine to propel the aircraft at the forward Mach number of 0.8, at the atmospheric pressure of 23000 Pa and the atmospheric temperature of −55 deg. C., such that the cycle operability parameter β satisfies the following:

$$1.3 K^{-1/2} \leq \beta \leq 2.0 K^{-1/2}.$$

3. The method of claim 1, further comprising:
operating the gas turbine engine to propel the aircraft at the forward Mach number of 0.8, at the atmospheric pressure of 23000 Pa and the atmospheric temperature of −55 deg. C., such that the cycle operability parameter β satisfies the following:

$$1.4K^{-1/2} \leq \beta \leq 2.0K^{-1/2}.$$

4. The method of claim 1, further comprising:
operating the gas turbine engine to propel the aircraft at the forward Mach number of 0.8, at the atmospheric pressure of 23000 Pa and the atmospheric temperature of −55 deg. C., such that the quasi-non-dimensional mass flow rate Q satisfies the following:

$$0.029 Kgs^{-1}N^{-1}K^{1/2} \leq Q \leq 0.036 Kgs^{-1}N^{-1}K^{1/2}.$$

5. The method of claim 1, further comprising:
operating the gas turbine engine to propel the aircraft at the forward Mach number of 0.8, at the atmospheric pressure of 23000 Pa and the atmospheric temperature of −55 deg. C., such that the specific thrust ST satisfies the following:

$$70 Nkg^{-1}s \leq ST \leq 110 Nkg^{-1}s.$$

6. The method of claim 1, wherein:
a fan tip loading is defined as $dH/Utip^2$, where dH is an enthalpy rise across the fan and Utip is a translational velocity of the fan blades at a tip of the leading edge; and
the method further comprises operating the gas turbine engine to propel the aircraft at the forward Mach number of 0.8, at the atmospheric pressure of 23000 Pa and the atmospheric temperature of −55 deg. C., such that that the fan tip loading $dH/Utip^2$ satisfies the following:

$$0.28 Jkg^{-1}K^{-1}/(ms^{-1})^2 < dH/Utip^2 < 0.36 Jkg^{-1}K^{-1}/(ms^{-1})^2.$$

7. The method of claim 1, wherein:
a fan pressure ratio, defined as a ratio of a mean total pressure of a flow at a fan exit to a mean total pressure of a flow at a fan inlet; and
the method further comprises operating the gas turbine engine to propel the aircraft at the forward Mach number of 0.8, at the atmospheric pressure of 23000 Pa and the atmospheric temperature of −55 deg. C., such that the fan pressure ratio is no greater than 1.5.

8. The method of claim 1, wherein:
the gas turbine engine further comprises an annular splitter at which divides flow between a core flow that flows through the engine core, and a bypass flow that flows along a bypass duct;
a fan root pressure ratio is defined as a ratio of a mean total pressure of a flow at a fan exit that subsequently flows through the engine core to a mean total pressure of a flow at a fan inlet; and
the method further comprises operating the gas turbine engine to propel the aircraft at the forward Mach number of 0.8, at the atmospheric pressure of 23000 Pa and the atmospheric temperature of −55 deg. C., such that the fan root pressure ratio is no greater than 1.25.

9. The method of claim 8, wherein:
a fan tip pressure ratio is defined as a ratio of a mean total pressure of flow at the fan exit that subsequently flows through the bypass duct to the mean total pressure of the flow at the fan inlet; and
the method further comprises operating the gas turbine engine to propel the aircraft at the forward Mach number of 0.8, at the atmospheric pressure of 23000 Pa and the atmospheric temperature of −55 deg. C., such that a ratio between the fan root pressure ratio to the fan tip pressure ratio is less than 0.95.

10. The method of claim 1, wherein a diameter of the fan is in a range of from 250 cm to 390 cm.

11. The method of claim 1, wherein the fan blades comprise a main body attached to a leading edge sheath, the main body and the leading edge sheath being formed of different materials.

12. The method of claim 11, wherein:
the leading edge sheath material comprises titanium; and
the main body material comprises carbon fibre or an aluminium alloy.

13. The method of claim 1, wherein:
the gas turbine engine further comprises an intake that extends upstream of the fan blades;
an intake length L is defined as an axial distance between a leading edge of the intake and a leading edge of a tip of the fan blades;
a fan diameter D is a diameter of the fan at the leading edge of the tips of the fan blades; and
a ratio L/D is in a range of from 0.2 to 0.45.

14. The method of claim 1, wherein the gearbox reduction ratio GR is in a range of from 3.1 to 3.8.

15. The method of claim 1, wherein:
the turbine is a first turbine, the compressor is a first compressor, and the core shaft is a first core shaft;
the engine core further comprises a second turbine, a second compressor, and a second core shaft connecting the second turbine to the second compressor; and
the second turbine, second compressor, and second core shaft are arranged to rotate at a higher rotational speed than the first core shaft.

16. A method of operating a gas turbine engine for an aircraft, the gas turbine engine having (i) an engine core comprising a turbine, a compressor, and a core shaft connecting the turbine to the compressor, (ii) a fan located upstream of the engine core, the fan comprising a plurality of fan blades, an annular fan face being defined at a leading edge of the fan, and (iii) a gearbox that receives an input from the core shaft and outputs drive to the fan so as to drive the fan at a lower rotational speed than the core shaft, the gearbox having a reduction ratio GR, the method comprising:
operating the gas turbine engine to propel the aircraft at a forward Mach number of 0.8, at an atmospheric pressure of 23000 Pa and an atmospheric temperature of −55 deg. C., such that:
a cycle operability parameter β satisfies the following:

$$1K^{-1/2} \leq \beta \leq 2K^{-1/2}$$

where:
a quasi-non-dimensional mass flow rate Q is defined as:

$$Q = W \frac{\sqrt{T0}}{P0 \cdot A_{fan}}$$

W is mass flow rate through the fan in Kg/s;
T0 is average stagnation temperature of air at the fan face in Kelvin;
P0 is average stagnation pressure of the air at the fan face in Pa;
$A_{fan}$ is an area of the fan face in m²;
a specific thrust ST is defined as net engine thrust (N) divided by mass flow rate (Kg/s) through the engine;

the cycle operability parameter $\beta$ is defined as:

$$\beta = \frac{GR}{Q \cdot ST};$$

and
the specific thrust ST satisfies the following:

$70 Nkg^{-1}s \leq ST \leq 85 Nkg^{-1}s.$

17. A method of operating a gas turbine engine for an aircraft, the gas turbine engine having (i) an engine core comprising a turbine, a compressor, and a core shaft connecting the turbine to the compressor, (ii) a fan located upstream of the engine core, the fan comprising a plurality of fan blades, an annular fan face being defined at a leading edge of the fan, and (iii) a gearbox that receives an input from the core shaft and outputs drive to the fan so as to drive the fan at a lower rotational speed than the core shaft, the gearbox having a reduction ratio GR, the method comprising:

operating the gas turbine engine to propel the aircraft at a forward Mach number of 0.8, at an atmospheric pressure of 23000 Pa and an atmospheric temperature of −55 deg. C., such that:
a cycle operability parameter $\beta$ satisfies the following:

$1 K^{-1/2} \leq \beta \leq 2 K^{-1/2}$ where:
a quasi-non-dimensional mass flow rate Q is defined as:

$$Q = W \frac{\sqrt{T0}}{P0 \cdot A_{fan}}$$

W is mass flow rate through the fan in Kg/s;
T0 is average stagnation temperature of air at the fan face in Kelvin;
P0 is average stagnation pressure of the air at the fan face in Pa;
$A_{fan}$ is an area of the fan face in m$^2$;
a specific thrust ST is defined as net engine thrust (N) divided by mass flow rate (Kg/s) through the engine;
the cycle operability parameter $\beta$ is defined as:

$$\beta = \frac{GR}{Q \cdot ST};$$

and
the quasi-non-dimensional mass flow rate Q satisfies the following:

$0.032 Kgs^{-1}N^{-1}K^{1/2} \leq Q \leq 0.036 Kgs^{-1}N^{-1}K^{1/2}.$

* * * * *